United States Patent
Sandberg (10) Patent No.: US 10,180,265 B2
(45) Date of Patent: Jan. 15, 2019

(54) MAGNETIC FILTER FASTENER

(71) Applicant: Leslye Sandberg, Barrington, IL (US)

(72) Inventor: Leslye Sandberg, Barrington, IL (US)

( * ) Notice: Subject to any disclaimer, the term of this patent is extended or adjusted under 35 U.S.C. 154(b) by 0 days.

(21) Appl. No.: 15/059,031

(22) Filed: Mar. 2, 2016

(65) Prior Publication Data

US 2017/0254562 A1   Sep. 7, 2017

(51) Int. Cl.
| | | |
|---|---|---|
| F24F 13/28 | (2006.01) | |
| H01F 7/02 | (2006.01) | |
| B01D 46/00 | (2006.01) | |
| F16B 1/00 | (2006.01) | |
| F16B 5/04 | (2006.01) | |
| F16B 21/02 | (2006.01) | |
| B01D 46/10 | (2006.01) | |

(52) U.S. Cl.
CPC ............ *F24F 13/28* (2013.01); *H01F 7/0252* (2013.01); *B01D 46/10* (2013.01); *B01D 2265/023* (2013.01); *F16B 5/04* (2013.01); *F16B 21/02* (2013.01); *F16B 2001/0035* (2013.01); *Y10T 24/32* (2015.01); *Y10T 24/42* (2015.01)

(58) Field of Classification Search
CPC .................. F24F 13/28; F16B 13/0808; F16B 2001/0035; Y10T 24/32; Y10T 24/44026
USPC ............................................ 248/206.5, 309.4
See application file for complete search history.

(56) References Cited

U.S. PATENT DOCUMENTS

| | | | | |
|---|---|---|---|---|
| 1,077,006 A | * | 10/1913 | Smith ................. | F16B 13/0808 411/345 |
| 5,156,482 A | * | 10/1992 | Owings ..................... | B63H 9/10 403/315 |
| 5,332,488 A | * | 7/1994 | Mitsuji ..................... | C25D 5/14 148/265 |
| 5,809,800 A | | 9/1998 | Deal | |
| 6,430,954 B1 | | 8/2002 | Smith | |
| 7,323,028 B2 | * | 1/2008 | Simmons ........... | B01D 46/0005 55/351 |
| 7,332,011 B1 | | 2/2008 | Sandberg | |
| 7,387,654 B1 | * | 6/2008 | Byers ................. | B01D 46/0005 55/385.1 |
| 7,547,341 B2 | | 6/2009 | Sandberg | |
| 7,842,116 B2 | * | 11/2010 | Simmons ........... | B01D 46/0005 55/480 |

(Continued)

OTHER PUBLICATIONS

Master Magnets Inc., "Round base Magnets and Assemblies", <http://www.magnetsource.com/Solutions_Pages/rndbaseassemb.html> webpage available as early as Jan. 14, 2012.

(Continued)

*Primary Examiner* — Robert Sandy
*Assistant Examiner* — Michael S Lee
(74) *Attorney, Agent, or Firm* — Michael Best & Friedrich LLP (57) ABSTRACT

A fastener for removably securing sheeting to a support surface, such as an HVAC system or other device. The fastener includes a base, a rare-earth magnet to removably couple the base to the support surface, the rare-earth magnet having an epoxy coating and being capable of securing the base to a pre-selected location on the support surface, and a locking member pivotably coupled to the base and adjustable between a selectable first position and a second position, and wherein the locking member remains in the selected position unless acted upon by a user.

14 Claims, 5 Drawing Sheets

(56) References Cited

U.S. PATENT DOCUMENTS

| | | | |
|---|---|---|---|
| 9,328,754 B2 | 5/2016 | Stokes | |
| 2009/0183844 A1* | 7/2009 | Alkhoury | E06B 9/52 160/369 |
| 2013/0036704 A1* | 2/2013 | Simmons | E06B 9/52 52/710 |
| 2014/0182114 A1 | 7/2014 | Stokes | |
| 2015/0375152 A1* | 12/2015 | Simmons | E06B 9/01 55/491 |
| 2016/0052095 A1* | 2/2016 | Simmons | B01D 46/0005 29/281.5 |

OTHER PUBLICATIONS

Stanford Magnets, "Coating for Magnets", <http://www.usneodymiummagnets.com/coating.html> webpage available as early as Feb. 2, 2015.

Stayput Fasteners Australia. "Stayput Fasteners", <http://www.stayputfasteners.com.au/index_2.html> webpage available as early as Mar. 6, 2005.

* cited by examiner

MAGNETIC FILTER FASTENER

BACKGROUND

The present disclosure relates to filter fasteners, and more specifically to a filter fastener that may be mounted in multiple orientations.

In industrial or commercial setting, air intakes, HVAC units and other forms of industrial equipment are often located in hostile environments which allow airborne particles and debris to enter sensitive equipment and cause loss of efficiency or equipment breakdown. Intake screens or filters are used to filter out that debris or particulate before it can gain entrance to the equipment. Because of the wide variety of equipment types, there are various orientations and configurations which must be considered. Additionally because of the variety of physical locations where equipment is located or used, the screens or filters should be easy to install, remove and replace. It would be helpful for the mounting fasteners to be useable in a wide range or variously configured and oriented intakes. Current fastener designs must generally be mounted by drilling into equipment, risking puncture of cooling coils and release of refrigerant gases into the atmosphere. Other mounting options such as pulleys or sliding loops must also include modification to the equipment surface. Furthermore, due to the hostile environments in which the screens and filters are positioned, delicate rare earth magnets, which are able to provide high magnetic coupling strength, easily corrode limiting their useful life.

SUMMARY

In one aspect, a fastener for removably securing sheeting to a support surface, including a rare-earth magnet to removably couple the base to the support surface, the rare-earth magnet having an epoxy coating and being capable of securing the base to a pre-selected location on the support surface, and a locking member pivotably coupled to the base and adjustable between a selectable first position and a second position, and wherein the locking member remains in the selected position unless acted upon by a user.

In another aspect, a fastener for removably securing sheeting to a support surface, including a base having a mounting shaft extending therefrom, where the mounting shaft defines a slot having a first width, a coupling member to removably couple the base to the support surface, and a locking member pivotably coupled to the base and at least partially positioned within the slot, the locking member being pivotable with respect to the base into different selected orientations with respect thereto, where the first width of the slot is such that the slot creates a frictional force against the locking member sufficient to maintain the locking member in its selected orientation with respect to the base regardless of the force of gravity.

In still another aspect, a fastener for removably securing sheeting to a support surface, including a base having a mounting shaft extending therefrom, the mounting shaft defining a slot having a first width, a rare-earth magnet to removably couple the base to the support surface, the rare-earth magnet having an epoxy coating and being capable of securing the base to a pre-selected location on the support surface, and a locking member pivotably coupled to the base and at least partially positioned within the slot, the locking member being pivotable with respect to the base into different selected orientations with respect thereto, where the first width of the slot is such that the slot creates a frictional force against the locking member sufficient to maintain the locking member in its selected orientation unless acted upon by a user.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Figure 1:
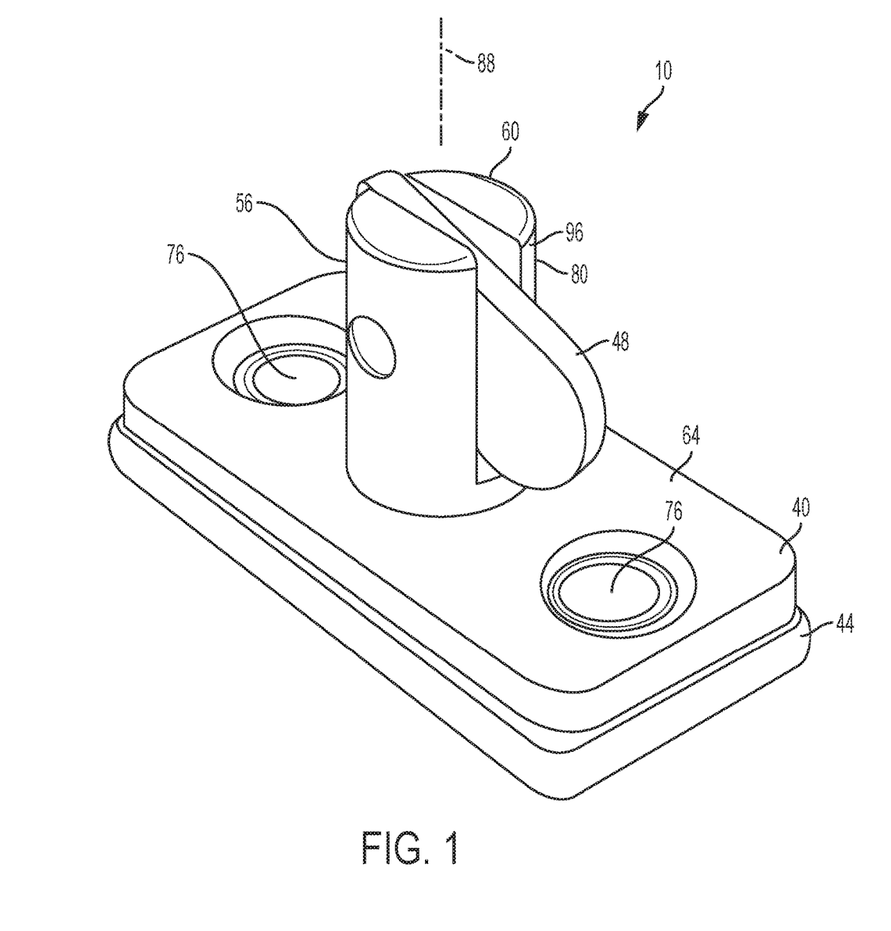
FIG. 1 is a perspective view of the filter fastener with the coupling member removed.
Figure 2:
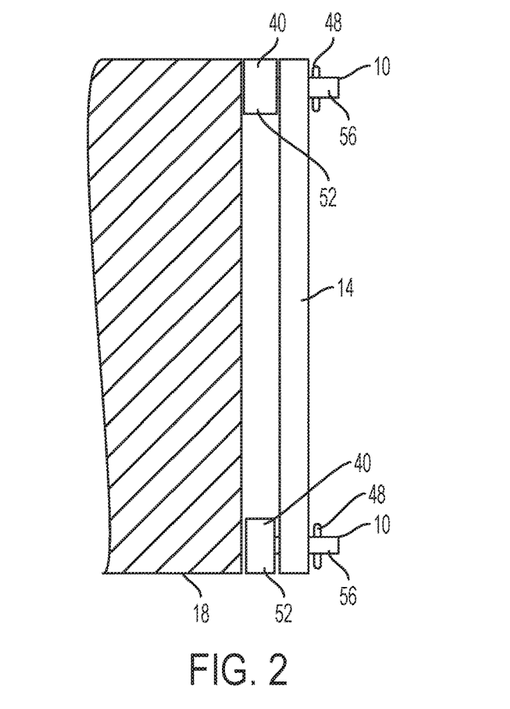
FIG. 2 is a schematic view of sheeting attached to a support surface by a pair of filter fasteners.
Figure 3:
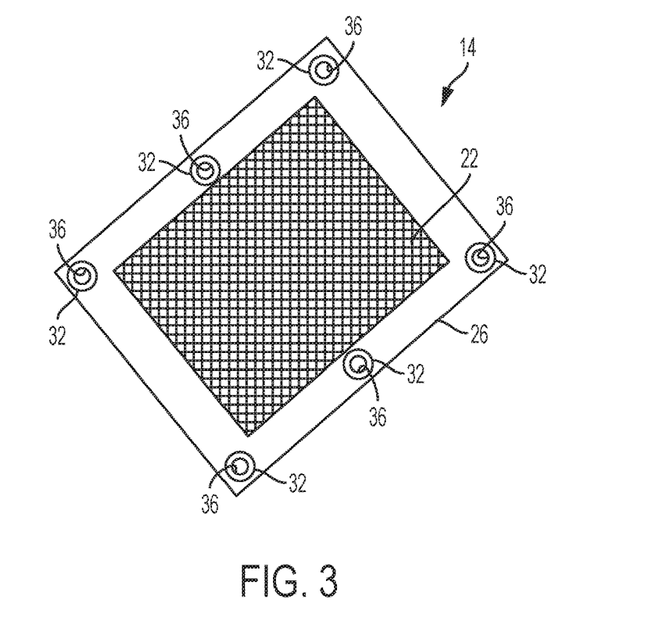
FIG. 3 is a top view of sheeting.
Figure 4:
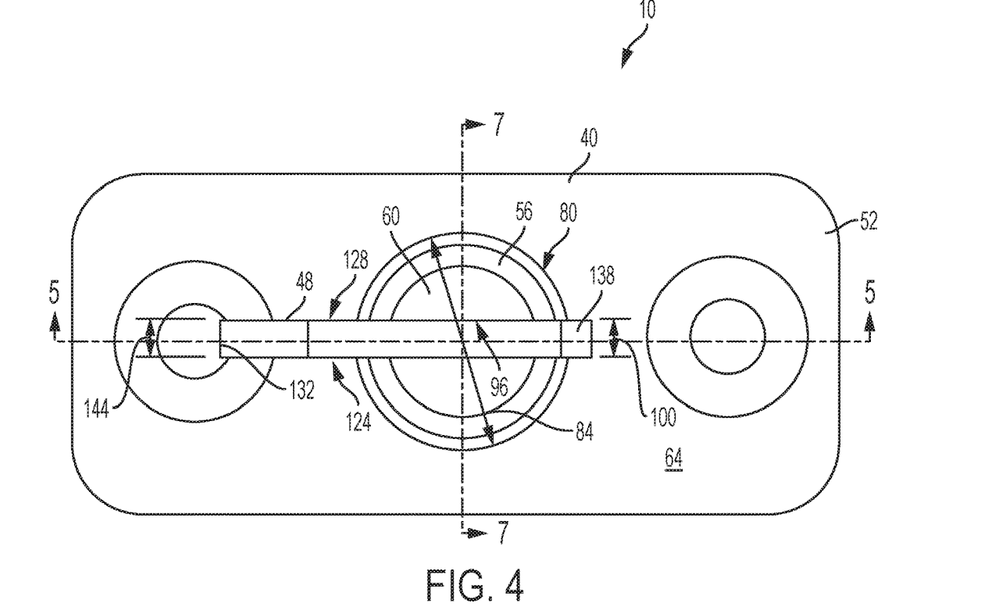
FIG. 4 is a top view of the filter fastener of the current invention.

FIGS. 1, 2 and 4-7 generally illustrate a filter fastener 10 of the present invention. The filter fastener 10 is generally utilized, in combination with other filter fasteners 10, to secure sheeting 14 to a support surface 18. For the purposes of this application, sheeting 14 may include, but is not limited to filters, screens, coiled blankets, solid blockers, tarps, shrouds, and other forms of sheeting material. More specifically, the filter fastener 10 may be used to position the sheeting 14 over the air intake of an industrial device, such as an HVAC system and the like (FIG. 2). In the illustrated construction, the sheeting 14 includes filter material 22 to remove particulates from the air passing therethrough, edging 26 at least partially supporting the filter material 22, and a plurality of mounting apertures 32 (FIG. 3). In the illustrated construction, the mounting apertures 32 are circular in shape defining a first inner diameter 36. However, in alternative constructions, the mounting apertures 32 may include different sizes or shapes as necessary. In still other constructions, the sheeting 14 may include any form that is well known in the art.

Illustrated in FIGS. 1 and 4-7, the filter fastener 10 of the present invention includes a base 40, a coupling member 44 coupled to the base 40, and a locking member 48 pivotably coupled to the base 40. During use, each filter fastener 10 is configured to be removably coupled to both a corresponding one of the mounting apertures 32 of the sheeting 14 and the support surface 18.

Illustrated in FIGS. 1 and 4-7, the base 40 of the filter fastener 10 includes a bottom 52 and a mounting shaft 56 extending perpendicularly from the bottom 52 having a distal end 60. The bottom 52 of the base 40 may be substantially rectangular in shape, having an upper surface 64, a bottom surface 68 opposite the upper surface 64, and defining a pair of apertures 72 therethrough. When the filter fastener 10 is assembled, each aperture 72 is sized to receive a respective rivet, screw or other mechanical fastener 76 therein. In the illustrated construction, each aperture 72 is countersunk to permit the fastener 76 to remain flush with the upper surface 64 of the bottom 52.

The mounting shaft 56 of the base 40 extends substantially perpendicular from the upper surface 64 of the bottom 52. The mounting shaft 56 passes through a corresponding mounting aperture 32 of the sheeting 14 to be mounted to support surface 18. The mounting shaft 56 may be substantially cylindrical in shape, having an outer annular surface 80 that defines a second diameter 84 and longitudinal axis 88 therethrough. The mounting shaft 56 also defines a cylindrically-shaped radial periphery 92, with the same second diameter 84 of the mounting shaft but also projecting axially beyond the shaft 56. The second diameter 84 of the shaft 56 is sized to be received within a corresponding mounting aperture 32 of the sheeting 14. In the illustrated construction, the mounting shaft 56 is cylindrical, however in alternative constructions, different shapes or cross-sections for both the shaft 56 and for periphery 92 may be utilized as necessary to accommodate the fastening requirements of the corresponding sheeting 14.

The mounting shaft 56 also defines a slot 96, originating at the distal end 60 of the shaft 56 and extending axially downwardly toward the base 40. The slot 96 also generally extends radially through both sides of the outer annular surface 80 and is open axially through the distal end 60 to form two substantially planar interior surfaces in contact with the sides 124, 128 of the locking member 48. In the illustrated construction, the slot 96 extends almost the entire axial length of the mounting shaft 56. The width 100 of the slot 96 is sized to permit at least a portion of the locking member 48 to be positioned therein. More specifically, the width 100 of the slot 96 is sized such that the locking member 48 is able to move (i.e., rotate) within the slot 96, but the slot 96 provides sufficient frictional force against the sides 124, 128 (described below) of the locking member 48 such that the locking member 48 will remain in its manually set rotational position regardless of the orientation of the base 40. Stated differently, the planar interior surfaces of the slot 96 provides sufficient frictional force against the sides 124, 128 of the locking member 48 so that, regardless of the orientation of the base 40 with respect to vertical, the locking member 48 will not rotate with respect to the base 40 unless acted upon by an exterior force other than gravity (i.e., the user). In alternative constructions, the slot 96 may include a detent (not shown), surface texture, ridges, or other forms of locking element to secure the locking member 48 in its rotational position regardless of the orientation of the base 40 with respect to vertical. In still other constructions, the slot 96 may include detents, surfaces textures, ridges, or other forms of locking element to secure the locking member 48 in any one of a plurality of pre-determined rotational positions regardless of the orientation of the base 40 with respect to vertical.

The mounting shaft 56 also defines a shaft pivot aperture 104 extending radially inwardly from the outer annular surface 80 and sized to receive at least a portion of a dowel pin 108 therein. In the illustrated construction, the shaft pivot aperture 104 is a blind hole, being open on only one side (FIG. 7); however in alternative constructions, the shaft pivot aperture 104 may extend through the entire diameter of the mounting shaft 56. In the illustrated construction (FIG. 7), the shaft pivot aperture 104 is positioned such that it extends perpendicularly through the slot 96, being in communication therewith.

The dowel pin 108 is at least partially positioned within the shaft pivot aperture 104 and configured to act as an axis of rotation for the locking member 48. The dowel pin 108 is substantially cylindrical in shape, having an outer diameter corresponding to both the size of the shaft pivot aperture 104 of the mounting shaft 56 and the size of the locking pivot aperture 112 in the locking member 48 (described below). When the filter fastener 10 is assembled, the dowel pin 108 is pressed into the shaft pivot aperture 104 of the mounting shaft 56, allowing the locking member 48 to pivot about the dowel pin's axis 116. In alternative constructions, the dowel pin 108 may include a polygonal cross-section (i.e., an octagonal-prism shape, and the like) where each flat surface acts as an indexing position for the locking member 48, allowing the locking member to remain in a particular indexing position regardless of the orientation of the base 40 with respect to vertical or the force of gravity.

Figure 5:
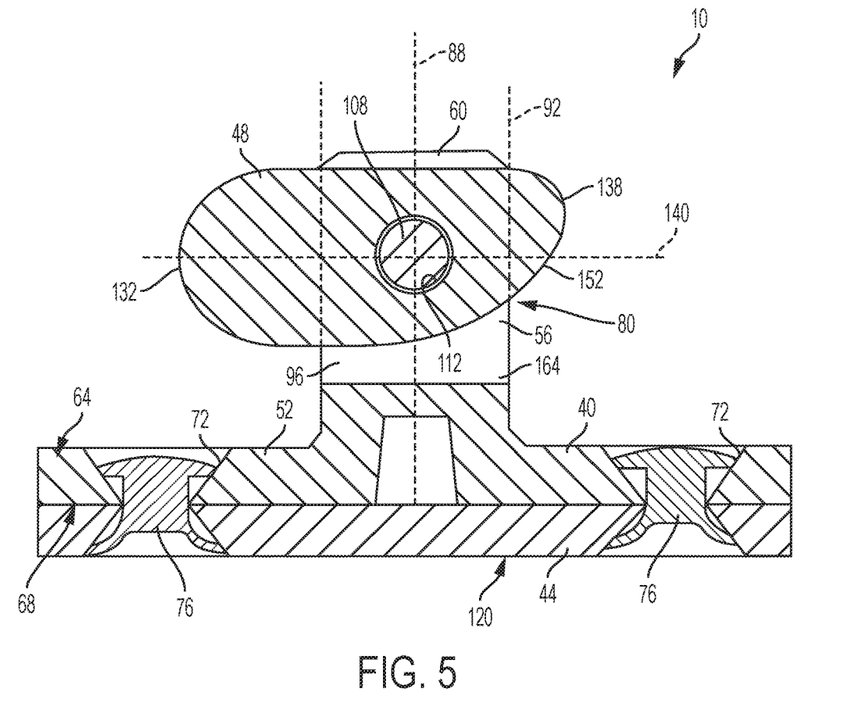
FIG. 5 is a section view taken along line 5-5 of FIG. 4 with the locking member in the second position.
Figure 6:
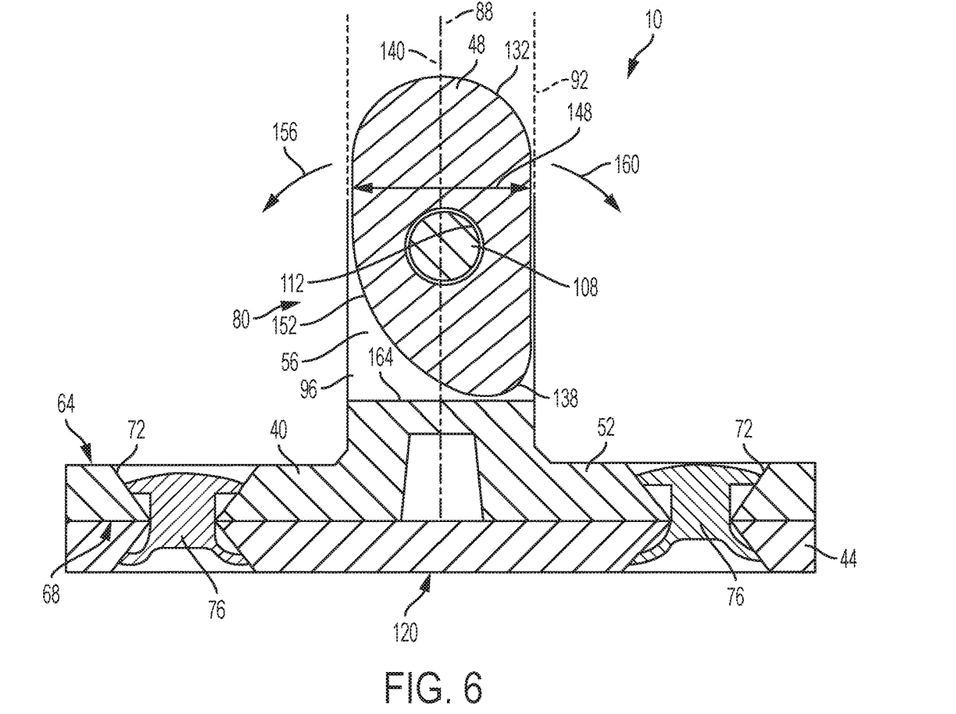
FIG. 6 is a section view taken along line 5-5 of FIG. 4 with the locking member in the first position.
Figure 7:
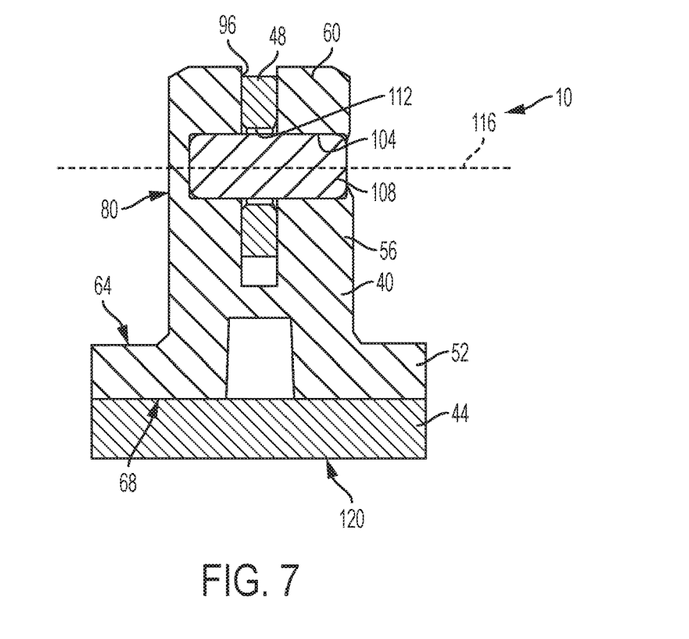
FIG. 7 is a section view taken along line 7-7 of FIG. 4.

Illustrated in FIGS. 5-7, the coupling member 44 of the filter fastener 10 is coupled to the bottom surface 68 of the base 40 by a pair of fasteners 76 and includes a contact surface 120 configured to contact the support surface 18, which is for example an air intake surface. Preferably, the coupling member 44 has sufficient contact surface area, weight, or holding power to maintain its location with respect to the support surface 18, taking into account the weight and forces being applied to the sheeting 14 during use. While not shown, the coupling member 44 may also include a rubber or other coating placed on the contact surface 120 to increase the friction formed with the support surface 18 and minimize any slippage that may occur. In still other constructions, the contact surface 120 of the coupling member 44 may include a texture formed therein. In instances where the coupling member 44 is intended to be attached to curved surfaces, the contact surface 120 may be contoured to match the same. In alternative constructions, the coupling member 44 may include Velcro, suction cups, adhesive strips and the like.

In the illustrated construction, the coupling member 44 includes a rare-earth magnet (e.g., a neodymium magnet or samarium-cobalt magnet) riveted to the bottom surface 68 of the base 40. To protect the magnet in outdoor conditions, the magnet is also coated by epoxy, which helps shield the magnet from the elements and corrosion, providing a longer lifetime than that of an untreated magnet, while also minimizing any interference with the magnetic field. In alternative constructions, the magnet may be coated by different materials such as rubber, plastic, gold, zinc, and the like.

Illustrated in FIGS. 1 and 4-7, the locking member 48 of the filter fastener 10 is an elongated plate having a first surface or side 124, a second surface or side 128 spaced a distance from the first surface 124, a first end 132, and a second end 138 opposite the first end 132. The locking member 48 also defines an elongated axis 140 extending therethrough (FIGS. 5-6). The distance between the first and second surfaces 124, 128 generally defines the thickness 144 of the locking member 48. The thickness 144 of the locking member 48 must be sufficiently large so as to provide the necessary structural strength to secure the sheeting 14 in place while also being properly sized so as to fit within and frictionally engage the slot 96 of the mounting shaft 56. Specifically, the level of frictional force exerted between the locking member 48 and the slot 96 at least partially dictates the level of force that must be applied to the locking member 48 to rotate it with respect to the slot 96. Generally speaking, the greater the frictional force between the locking member 48 and the slot 96, the greater the required force to rotate the locking member 48. In the illustrated construction, both the first and second surfaces 124, 128 are substantially planar; however in alternative constructions, the surfaces 124, 128 may include grooves, knurling, detents, or other textures to increase the frictional forces between the locking member 48 and the base 40. Furthermore, the width 148 of the locking member 48 is substantially equal to the second diameter 84 of the mounting shaft 56.

The first end 132 of the locking member 48 is substantially rounded, having a constant radius to provide a substantially semi-circular edge. The first end 132 of the locking member 48 is configured to act as a leading edge, being shaped such that the locking member 48 can be easily aligned with and pass through the corresponding mounting aperture 32 of the sheeting 14. In alternative constructions, the first end 132 may be blunt, or may include a more pointed contour to allow the first end 132 to physically pierce through items (not shown).

The second end 138 of the locking member 48 is asymmetrical having a large radius 152 extending along one side. The radius 152 is positioned such that, when the locking member 48 is installed in the slot 96 of the mounting shaft 56 in a first position (FIG. 6, described below), the locking member 48 can rotate in a first direction 156 but not in a second direction 160. More specifically, the radius 152 of the second end 138 is shaped such that the radius 152 will clear the bottom end 164 of the slot 96 when the locking member 48 is rotated about dowel pin 108 in the first direction 156. However, the second end 138 will contact the bottom end 164 of the slot 96, restricting the rotation of the locking member 48, if the locking member is rotated in the second direction 160. In alternative constructions, the second end 138 may include a pair of radii (not shown) to permit the locking member 48 to rotate in either direction when installed in the mounting shaft 56 in the first position. In the illustrated construction, the locking pivoting aperture 112 for dowel pin 108 is off-center, being positioned closer to the second end 138 of the locking member 48 than the first end 132. In alternative constructions, the locking pivot aperture 112 may be positioned in a more central location (not shown)

During use, the locking member 48 of the filter fastener 10 is at least partially positioned within the slot 96 of the mounting shaft 56 and rotatable about the axis 116 of the dowel pin 108 between a first position (FIG. 6), and a second position (FIG. 5), and one or more intermediate positions therebetween. The locking member 48 is installed in the slot 96 such that it will remain in its selected position unless acted upon by a user and regardless of the orientation of the base with respect to vertical. Furthermore, the locking member 48 will remain in its selected position regardless the force of gravity. In the present application, regardless the force of gravity generally signifies that the locking member 48 will not move or pivot with respect to the base 40 under the force of gravity, regardless of the orientation at which the gravitational force is applied to the locking member 48.

When the locking member 48 is in the first position, the elongate axis 140 of the locking member 48 is substantially aligned with the axis 88 of the mounting shaft 56. In such an orientation, the first end 132 of the locking member 48 extends beyond the distal end 60 of the mounting shaft 56 to form the tip of the fastener 10 (FIG. 6). Furthermore, when the locking member 48 is in the first position, no portion of the locking member 48 extends outside the radial periphery 92 of the shaft 56.

Contrarily, when the locking member 48 is in the second position, the elongate axis 140 of the locking member 48 does not align with the axis 88 of the mounting shaft 56 and at least a portion of the locking member 48 extends outside the radial periphery 92 of the shaft 56. In the illustrated construction, both the first end 132 and the second end 138 of the locking member 48 extend outside the radial periphery 92 of the shaft 56 when the locking member 48 is in the second position. More specifically, the first end 132 and the second end 138 extend beyond the periphery 92 of the shaft 56 to create a locking distance (i.e., the distance between the first end 132 and the second end 138 measured perpendicularly to the axis 88) that is greater than the first inner diameter 36 of the mounting apertures 32 of the sheeting 14.

Figure 8:
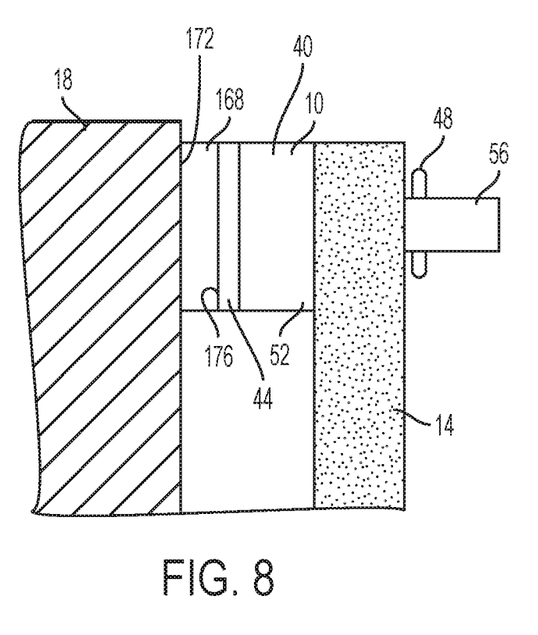
FIG. 8 is a schematic view of sheeting attached to a support surface by a filter fastener and an adapter plate.

FIG. 8 illustrates an adapter plate 168 for use with the filter fastener 10. The adapter plate 168 is configured to be positioned between and coupled to both the support surface 18 and the filter fastener 10 in instances where the coupling member 44 may not be couplable to the support surface 18 directly (e.g., a magnetic coupling member 44 and a non-ferrous support surface 18). More specifically, the adapter plate 168 includes a first interface 172 configured to be couplable to the support surface 18, and a second interface 176 opposite the first interface 172 configured to be couplable with the coupling member 44 of the filter fastener 10. In the illustrated construction, the adapter plate 168 is a metallic plate with an adhesive applied to a surface 182. As such, the adhesive provides the first interface 172 that is couplable to non-ferrous support surfaces while the metallic plate provides a second interface 176 compatible with a magnetic coupling member 44 (i.e., a rare earth magnet). In still other embodiments, the adapter plate 168 may include any combination of coupling types (e.g., different types of adhesives, Velcro, magnets, hooks, clips, apertures, protrusions, and the like) applied to the first and second interfaces 172, 176 to accommodate the mounting type of the support surface 18 and the type of coupling member 44 coupled to the filter fastener 10.

To secure a sheeting 14 on a support surface 18, the user first obtains the desired number of filter fasteners, typically one filter fastener 10 for each mounting aperture 32 in the sheeting 14. The user then aligns a filter fastener 10 with a corresponding mounting aperture 32 in the sheeting 14 (FIG. 2). To do so, the user first rotates each locking member 48 into the first position (FIG. 6). With the locking member 48 in position, the user then axially aligns and inserts the mounting shaft 56 into the corresponding mounting aperture 32 allowing the curvature of the first end 132 to help aid alignment and insertion. Once the mounting shaft 56 is completely inserted, the user may then rotate the locking member 48 with respect to the mounting shaft 56 from the first position to the second position (FIG. 5). By rotating the locking member 48, both the first end 132 and the second end 138 of the locking member 48 extend beyond the radial periphery 92 of the shaft 56 and create a locking distance that is greater than the first inner diameter 36 of the mounting aperture 32. As such, the mounting aperture 32 cannot be axially removed inadvertently from the shaft 56. The user then repeats the preceding steps for each remaining filter fastener 10 and mounting aperture 32.

With all the filter fasteners 10 in place, the user may then anchor the sheeting 14 to the support surface 18 by placing the contact surface 120 of each coupling member 44 of the filter fasteners 10 in contact with the support surface 18. The collective holding power of the coupling members 44 then maintain the position of the sheeting 14 on the support surface 18.

Typically, once the filter fasteners are anchored to the support surface, the filter fasteners do not need to be moved, although that is easily accomplished when the coupling members 44 are magnetic. To remove or replace the sheeting 14, the user first rotates the locking member 48 from the second position (FIG. 5) to the first position (FIG. 6), thereby causing the locking member 48 to be positioned inside the radial periphery 92 of the shaft 56 and also within the inner diameter 36 of the mounting aperture 32. As a result, the locking distance becomes effectively zero and the shaft 56 may then be axially removed from the mounting aperture 32.

What is claimed is:

1. A fastener for removably securing sheeting to a support surface, the fastener comprising:
   a base;
   a mounting shaft extending from the base, wherein the base and the mounting shaft are immovable and fixed relative to one another;
   a rare-earth magnet coupled to the base such that the base and rare-earth magnet are immovable and fixed relative to one another, the rare-earth magnet configured to magnetically couple the fastener to the support surface, the rare-earth magnet having an epoxy coating and being capable of securing the fastener to the support surface regardless of the orientation of the support surface; and
   a locking member pivotably coupled to the mounting shaft and adjustable between a selectable first position and a second position, and wherein the locking member remains in the selected position unless acted upon by a user regardless of the orientation of the base.

2. The fastener of claim 1, wherein the mounting shaft defines a radial periphery, and wherein the locking member is adjustable between a first position, where at least a portion of the locking member extends beyond the radial periphery of the mounting shaft, and a second position, where the locking member does not extend beyond the radial periphery of the mounting shaft.

3. The fastener of claim 1, wherein the mounting shaft defines a slot, and wherein the locking member is at least partially positioned within the slot.

4. The fastener of claim 3, wherein the slot is sized such that it creates a frictional force against the locking member sufficient to retain the locking member in the selected position unless acted upon by a user.

5. The fastener of claim 1, wherein the locking member is adjustable between a first position, a second position, and one or more intermediate positions, and wherein the locking member remains in a selected one of the first position, the second position, and the one or more intermediate positions unless acted upon by a user.

6. The fastener of claim 1, wherein the locking member remains in the selected position regardless of the orientation of the base with respect to vertical.

7. A fastener for removably securing sheeting to a support surface, the fastener comprising:
   a base;
   a mounting shaft extending from the base, wherein the mounting shaft defines a slot having a first width, and wherein the base and the mounting shaft are immovable and fixed relative to one another;
   a rare-earth magnet coupled to the base such that the base and rare-earth magnet are immovable and fixed relative to one another, wherein the rare-earth magnet is configured to maintain the fastener on the support surface regardless of the orientation of the support surface; and
   a locking member pivotably coupled to the mounting shaft and at least partially positioned within the slot, the locking member being pivotable with respect to the mounting shaft into different selected orientations with respect thereto, wherein the first width of the slot is such that the slot creates a frictional force against the locking member sufficient to maintain the locking member in its selected orientation with respect to the base regardless of the force of gravity.

8. The fastener of claim 7, wherein the rare-earth magnet has sufficient holding strength to maintain the location of the base on the support surface regardless of the orientation of the base with respect to vertical.

9. The fastener of claim 7, wherein the rare-earth magnet includes an epoxy coating.

10. The fastener of claim 7, wherein the mounting shaft defines a radial periphery, and wherein the locking member is adjustable between a first position, where at least a portion of the locking member extends beyond the radial periphery of the mounting shaft, and a second position, where the locking member does not extend beyond the radial periphery of the mounting shaft.

11. The fastener of claim 7, wherein the sheeting defines one or more mounting apertures, and wherein the locking member is adjustable between a first position, where the mounting shaft can pass through the mounting aperture, and a second position, where the mounting shaft is unable to pass through the mounting aperture, and wherein the locking member remains in the selected position regardless of the force of gravity.

12. The fastener of claim 7, wherein the mounting shaft has a distal end and defines a radial periphery, wherein the slot extends axially from the distal end toward the base, and wherein the slot is open radially through the radial periphery.

13. A fastener for removably securing sheeting to a support surface, the fastener comprising:
   a base;
   a mounting shaft extending from the base, the mounting shaft defining a slot having a first width, and wherein the mounting shaft and the base are immovable and fixed relative to one another;
   a rare-earth magnet coupled to and immovable and fixed relative to the base to removably couple the fastener to the support surface regardless of the orientation of the support surface, the rare-earth magnet having an epoxy coating and being capable of securing the base to the support surface; and
   a locking member pivotably coupled to the mounting shaft and at least partially positioned within the slot, the locking member being pivotable with respect to the base into different selected orientations with respect thereto, wherein the first width of the slot is such that the slot creates a frictional force against the locking member sufficient to maintain the locking member in its selected orientation unless acted upon by a user.

14. The fastener of claim 13, wherein the mounting shaft defines a radial periphery, and wherein the locking member is pivotable between a first position, where at least a portion of the locking member extends beyond the radial periphery of the mounting shaft, and a second position, where the locking member does not extend beyond the radial periphery of the mounting shaft.

* * * * *